UNITED STATES PATENT OFFICE.

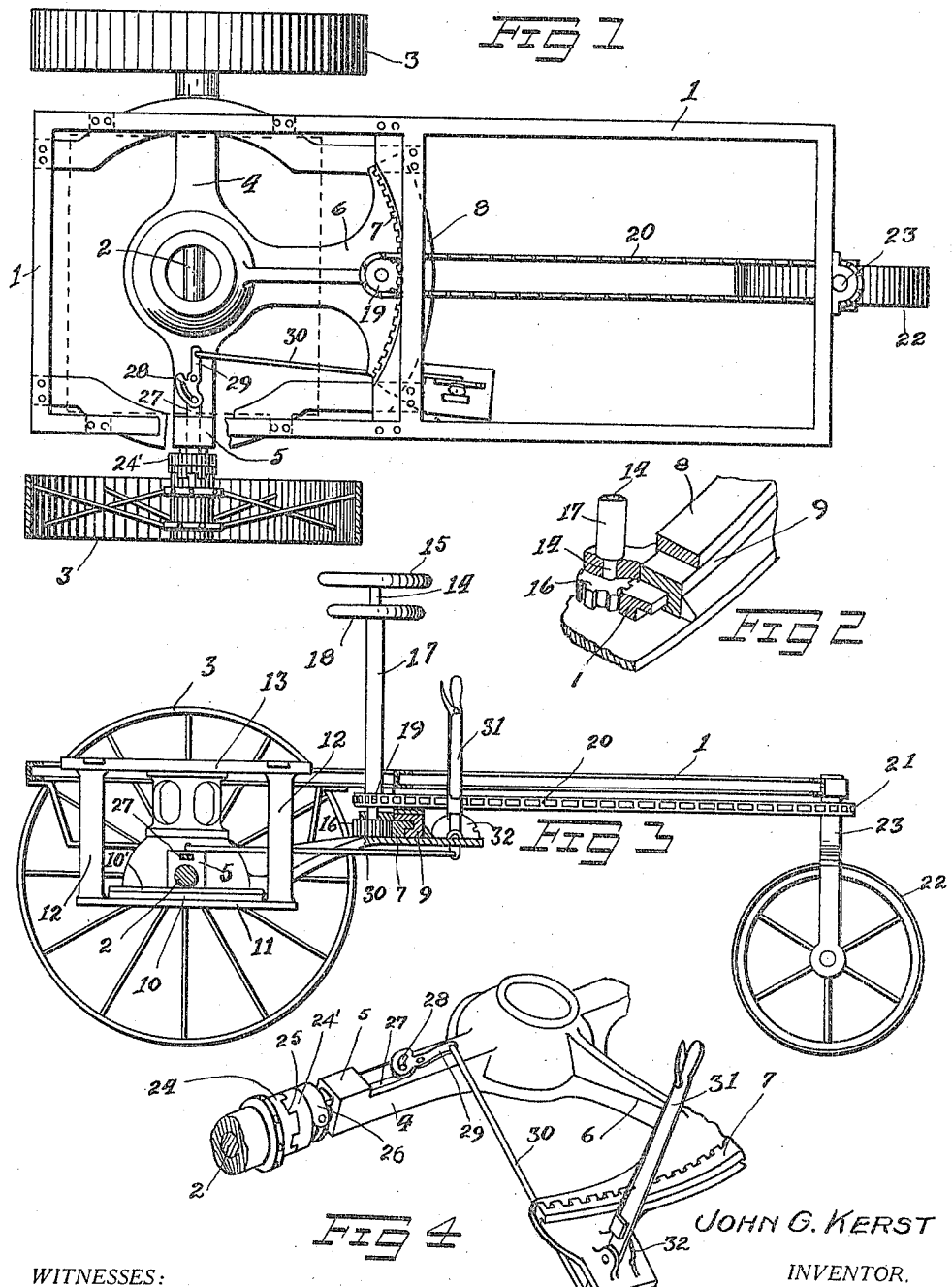

JOHN G. KERST, OF SPRINGFIELD, ILLINOIS.

STEERING DEVICE FOR MOTOR-TRUCKS.

1,180,505. Specification of Letters Patent. Patented Apr. 25, 1916.

Application filed April 15, 1914. Serial No. 832,129.

*To all whom it may concern:*

Be it known that I, JOHN G. KERST, a citizen of the United States, residing at Springfield, in the county of Sangamon and State of Illinois, have invented the new and useful Improvements in Steering Devices for Motor-Trucks, of which the following is a specification.

My invention relates to motor driven trucks, and applies particularly to the steering apparatus for a truck whereon the driving means is applied to the forward axle and wheels.

The principal object of my invention is to provide an apparatus of the above character which will be simple in construction and manufacture, and which will be efficient and convenient of operation.

My invention comprises the new and useful details of construction and arrangement of elements, which will be hereinafter fully specified, illustrated in the annexed drawings, and pointed out more specifically in the appended claims.

In the drawings:—Figure 1 is a top plan view of a truck wherein is combined the steering gear of my invention. Fig. 2 is a fragmentary detail perspective view of the lower end of the steering post and gear for rotating the forward axle and wheels of my truck about the fifth wheel. Fig. 3 is a side view of the truck of my invention, partly in section, and partly in elevation. Fig. 4 is a fragmentary perspective view of the axle housing, gear rack, and wheel clutch, as embodied in my invention.

In the several views illustrating my invention, like reference characters refer to like or corresponding parts throughout.

Referring now to the drawings, wherein I have illustrated the preferred embodiment of my invention, numeral 1 designates in general the frame work of a truck, supported on the forward end by an axle 2 carried by wheels 3, the wheels being normally keyed to the axle and adapted to be revolved thereby. About axle 2 I provide an axle housing unit, designated in general as 4, box bearings 5 being provided adjacent each end of the unit, wherein the weight of the forward end of the truck rests upon the axle. Projecting rearward from housing 4, is an arm 6, having thereon an arcuate gear rack 7.

Numeral 8 designates a bracket attached to the under side of the frame, and having bolted thereto an arcuate bearing ring 9, which ring engages the gear rack, allowing the gear rack to slide thereunder.

Numeral 10 designates a fifth wheel adapted to register with a similar wheel 10' on the under face of the housing 4, the fifth wheel 10 being supported by a plate 11 suspended from the frame 1 by columns 12.

Numeral 13 designates a platform upon which the motor or engine driving the truck is anchored, the platform being supported from the truck frame 1 by brackets or pedestals, not shown.

By reference to my application for Letters Patent, Serial No. 790,817 filed September 20, 1913, the details of the method of driving my truck may be ascertained.

Numeral 14 designates a steering post, having a hand wheel 15 fixed thereto, and provided with a gear 16 at the lower end. Gear 16 is adapted to mesh with gear rack 7, and to actuate the same with the rotation of steering wheel 15. About steering post 14 is disposed a hollow tube 17, having a second steering wheel 18 on the upper end thereof, and a rear steering gear 19 on the lower end.

Numeral 20 designates a chain trained about gear 19 and extended rearward and about gear 21 fixed to rear steering wheel fork 23. Fork 23 is pivoted by any suitable means to the rear end of the frame, and is adapted to carry therein the rear supporting wheel 22.

It will be readily seen that the foregoing apparatus will effect the rotation of the forward wheels about fifth wheel 10, when the steering post 14 and gear 16 is revolved by steering wheel 15. Likewise, the rear wheel fork 23 may be rotated by the actuation of steering wheel 18 and gear 19, through the medium of chain 20 and gear 21.

Wheels 3 are fixed to normally revolve with axle 2, but I have provided effective means to disengage the wheels from such actuation, when it is desired to make a shorter turn than such an arrangement would permit. This device is best illustrated in Fig. 4, to which I now refer.

Numeral 24 designates the hub of one of the wheels 3, the inner face of said hub being notched out as shown at 25. A sliding collar 24' is keyed to axle 2, and is also notched as shown at 25, and is provided with a groove in which a stationary clutch ring 26 slides. A link 27 is attached thereto and is engaged in a cam 28 carried by lever 29. Lever 29 is pivoted adjacent the cam 28, and a reach rod 30 is pivoted to the inner end of the lever. The reach rod 30 is adapted to be actuated forward and rearward by a hand lever 31, pivoted to casting 6, a quadrant 32 and means for locking the lever in position being provided. It will be seen that by actuating reach rod 30 the lever 29 will actuate the clutch into and out of engagement at 25, through the medium of link 27 and cam 28. Such an arrangement may be provided for each of the wheel hubs when desired.

While I have herein described and illustrated the preferred embodiment of my invention, I do not wish to be limited to the exact details shown, except for such limitations as the claims may import, as it is obvious that various changes may be made without departing from the broad spirit of my invention.

Having thus described my invention what I claim is:—

1. The combination in a motor driven truck, of a truck frame pivotally supported at the forward end by a motor driven axle and traction wheels, an arcuate gear rack fixed to said forward axle, a steering post, a gear carried by said steering post adapted to mesh with the gear rack on the axle, a fork pivoted adjacent the rear end of the truck frame, an auxiliary steering wheel disposed in said fork, a gear on said fork, an auxiliary steering post comprising a hollow tube disposed about the first named steering post, a gear carried by the auxiliary steering post, a chain trained about the gear on the auxiliary steering post and the gear on the fork, and hand wheels on each of said steering posts, substantially as described.

2. In a motor driven truck, a motor driven forward axle, an axle housing on said axle, a fifth wheel on said housing, a truck frame supported on said axle housing, a fifth wheel suspended from the truck frame and engaged to rotate on the fifth wheel on the axle housing, an arcuate gear rack fixed to the axle housing, a steering post, a gear carried by the steering post adapted to mesh with the gear rack on the axle housing, a fork pivoted adjacent the rear end of the truck frame, an auxiliary steering wheel disposed in said fork, a gear on said fork, an auxiliary steering post comprising a hollow tube disposed about the first named steering post, a gear carried by the auxiliary steering post, a chain trained about the gear on the auxiliary steering post and the gear on the fork, and hand wheels on each of said steering posts.

JOHN G. KERST.

Witnesses:
LEO MATTHEWS,
MARGARET EASINGER.

Copies of this patent may be obtained for five cents each, by addressing the "Commissioner of Patents, Washington, D. C."